June 24, 1930. A. M. TROGNER 1,766,048
CURRENT TRANSFORMER FOR HIGH FREQUENCY CURRENTS
Filed Dec. 10, 1928
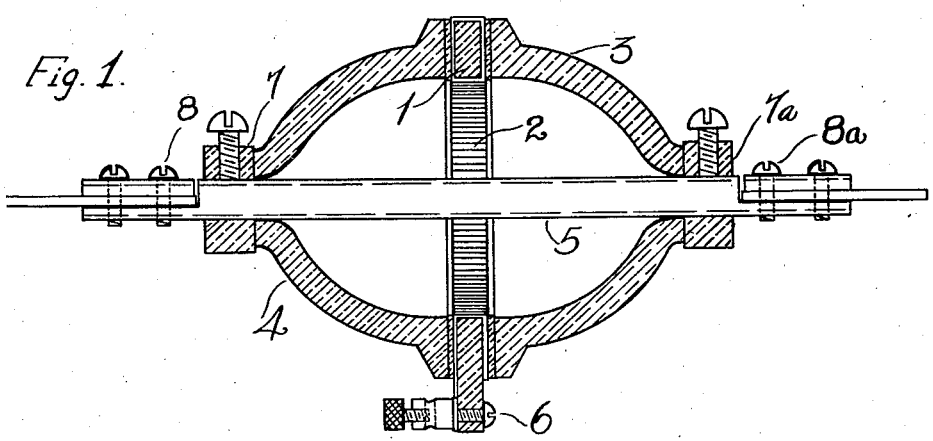
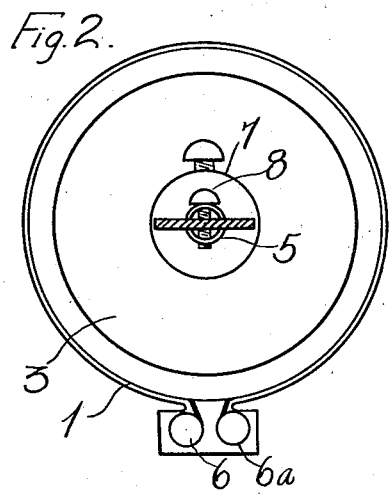 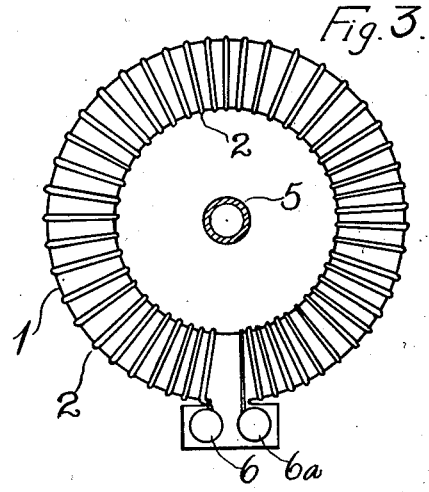
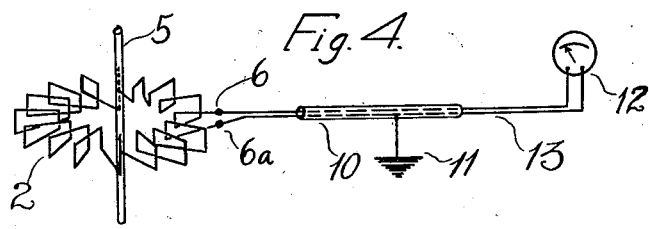

Patented June 24, 1930

1,766,048

UNITED STATES PATENT OFFICE

ARTHUR M. TROGNER, OF EAST ORANGE, NEW JERSEY, ASSIGNOR, BY MESNE ASSIGNMENTS, TO FEDERAL TELEGRAPH COMPANY, A CORPORATION OF CALIFORNIA

CURRENT TRANSFORMER FOR HIGH-FREQUENCY CURRENTS

Application filed December 10, 1928. Serial No. 325,105.

My invention relates to current transformers in general and more specifically to current transformers employed in combination with an indicating device for determining large values of high frequency electrical energy.

An object of my invention is to provide a current transformer which is efficient and which will represent with accuracy the conditions of the energy in the circuit with which it may be associated.

Another object of my invention is to provide a current transformer for measuring values of high frequency signaling energy in a conductor without appreciably disturbing the potential distribution in the conductor. Other and further objects of my invention reside in the structure of the current transformer of my invention, a better understanding of which can be had from the specification following and by referring to the accompanying drawings, wherein:

Figure 1 shows a cross-sectional view of the current transformer of my invention; Fig. 2 is an illustration showing an end view of the current transformer of my invention; Fig. 3 shows the secondary of the current transformer of my invention and Fig. 4 is a schematic diagram showing the operation of the current transformer of my invention.

In high frequency signaling systems and especially in transmitting systems employing considerable power it is necessary to determine the high frequency current in the different circuits. It is often desirable if not necessary to place the current indicating instrument at a considerable distance from the high frequency circuit. The losses incurred by running long leads from the high frequency circuit to the indicating instrument make necessary some form of current measuring device other than the commonly used high frequency meter inserted directly in the high frequency circuit. A meter of suitable dimensions to indicate relatively large values of current is not to be desired. To avoid the aforementioned disadvantages a current or instrument transformer may be provided. The primary conductor should have a relatively low inductance and resistance. The secondary should be of the proper design to avoid distorting the wave form or energy distribution in the primary circuit. A better understanding of the current transformer of my invention can be had by referring to the accompanying drawings.

Fig. 1 is an illustration showing a cross-section of the secondary coil form 1, supporting members 3, 4 and clamping rings 7, 7ª, and a side elevation of primary conductor 5. Secondary 2 comprises a winding encircling coil form 1. Coil form 1 consists of an annular member of suitable insulating material such as a silicate compound or phenol composition. Coil form 1 is supported, in respect to primary conductor 5, by insulating members 3 and 4. Insulating members 3 and 4 may be cup-shaped pieces of suitable insulating material. Insulating and supporting members 3 and 4 are caused to form a hermetically sealed envelope enclosing conductor 5 and secondary coil form 1, by the positioning of suitable clamping rings at 7 and 7ª as shown. Conductor 5 may be of any suitable metal. The opposite ends of conductor 5 are closed and provided with terminals 8 and 8ª for connecting to the high frequency circuit of which the current is to be measured. Suitable terminals 6 are provided on coil form 1 to which the opposite ends of winding 2 are connected. Terminals 6 may be connected to the indicating meter. Fig. 2 shows an end view of the current transformer of my invention. Primary conductor 5 is centrally disposed in respect to insulating and supporting member 3. Clamping ring 7 and terminal 8 are shown. Terminals 6 and 6ª are positioned on coil form 1.

Fig. 3 shows the secondary winding 2 supported on coil form 1. The secondary winding 2 is a coil or circular solenoid having a rectangular cross-section. The axial depth of the winding which is a torus, is less than the difference between the length of the inner radius and outer radius of the winding. The inner and outer radius is measured from the axis which corresponds to the center of conductor 5. The ratio between the difference of the inner and outer radius as compared to the axial depth of the torus winding is approximately 5 to 1. The toroidal coil has little effect on the frequency characteristics and the energy distribution in the primary conductor 5. Form 1 may be of any suitable insulating material. Terminals 6 and 6ª are provided, which are connected to the opposite ends of winding 2.

Fig. 4 is a schematic circuit diagram showing the operation of the current transformer of my invention. Secondary winding 2 comprising a toroidal coil of rectangular cross-section, encircles conductor 5. Conductor 5 comprises the primary of the current transformer and may be of any suitable metal having a low electrical resistance to high frequency energy. Conductor 5 may take the form of a straight length of metal thereby providing a primary of low inductance and low capacity values. The current in winding 2 will be inversely proportional to the ratio of the secondary turns or number of turns in winding 2 to the number of primary turns. As heretofore mentioned the primary should have a low inductance and a low capacity and hence a single turn or straight conductor as illustrated is sufficient. The ratio of secondary turns to primary turns should be high. The electrostatic capacity is reduced to a marked degree by the torus winding 2 and the spacial relation thereof in respect to conductor 5. Connections are provided from terminals 6 and 6ª of winding 2 to a suitable indicating device 12. Connecting leads 13 may be of suitable insulated wire and may have a metal sheath 10 which is connected to ground 11. Indicating device 12 should preferably be of the thermo-milliammeter type although any sensitive type of high frequency energy indicating device may be employed.

The construction of the current transformer as shown in Fig. 1, provides a hermetically sealed primary and secondary. The secondary coil comprises a torus winding supported on an insulating form and is spacially positioned in respect to the primary conductor. This construction provides a high insulation between the two circuits and correspondingly low electrostatic coupling.

I realize that many modifications of the current transformer of my invention are possible without departing from the spirit of my invention and it is to be understood that the embodiments of my invention shall not be limited to the specific arrangements shown in the accompanying drawings and described in the foregoing specification but only as defined in the scope of the appended claims.

What I claim as new and desire to secure by Letters Patent of the United States is as follows:

1. A current transformer comprising a primary conductor having a relatively low inductance and a secondary conductor comprising a toroidal coil encircling said primary conductor and insulated members located adjacent opposite ends of said primary conductor and extending toward each other, said toroidal coil being disposed between the ends of said insulated members and spacially positioned and supported thereby.

2. A current transformer comprising in combination a primary conductor having a relatively low inductance and a secondary having a relatively high inductance, said secondary comprising a toroidal coil and a pair of insulated members each having a gradually changing diameter and extending from a position adjacent opposite ends of said primary conductor to a position engaging opposite sides of said toroidal coil whereby said toroidal coil is spacially positioned in respect to said primary conductor and supported thereby.

3. A current transformer comprisng a primary conductor having a relatively low inductance and a secondary conductor having a relatively high inductance, said secondary comprising a torus winding supported on an annular form, a pair of insulated cup shaped members, said cup shaped members being disposed on opposite sides of said annular form and extending from positions adjacent the ends of said primary conductor whereby said torus winding may be supported and spacially positioned in respect to said primary conductor.

4. A current transformer comprising in combination a primary conductor and a secondary conductor, said secondary conductor comprising a torus winding supported on an insulating form, a pair of insulated cup shaped members having their adjacent ends engaging opposite sides of said torus winding and having their remote ends supported adjacent opposite ends of said primary conductor whereby said secondary conductor is supported and spacially positioned in respect to said primary conductor.

5. A current transformer comprising in combination a primary conductor and a secondary conductor, said primary conductor comprising a length of metal having a low inductance and said secondary comprising a torus winding supported on an annular form of insulating material, a clamp secured adjacent each end of said primary conductor and cup shaped members extending between each of said clamps and the sides of said annular form for supporting said annular form substantially midway between the ends of said primary conductor and spacially related with respect thereto.

6. A current transformer comprising in combination a secondary conductor comprising a torus winding supported on an insulating coil form the axis of which is common to a conductor therethrough constituting the primary conductor, an annular clamp encircling each end of said conductor, a substantially cup shaped insulator disposed between each of said clamps and one side of said coil form for centering said torus winding around said conductor in spacial relation thereto.

7. A current transformer comprising in combination a secondary conductor and a primary conductor, said secondary conductor comprising a toroidal coil supported on an annular insulating form and said primary conductor comprising a metal member constituting the axis of said annular form, an annular clamp carried by each end of said metal member, a cup shaped member of insulated material extending between each of said annular clamps and opposite sides of said annular form for supporting said form intermediate the ends of said metal member for insulatingly suspending said secondary conductor.

8. A current transformer for high frequency electrical energy comprising in combination an annular form, a primary conductor passing through the axis of said annular form and a toroidal coil comprising the secondary winding supported around the periphery of said annular form, an annular clamp secured adjacent each end of said primary conductor, a cup shaped member of insulating material abutting the annular clamp at each end of said conductor and extending toward each other for engaging opposite sides of said toroidal coil for suspending said toroidal coil with respect to said primary conductor.

9. A current transformer for high frequency electrical energy comprising in combination, a container comprising a pair of independent cup shaped members of insulating material, a primary conductor, a secondary conductor, said secondary conductor comprising a torus winding supported on an annular form, and means for positioning said cup shaped members on opposite sides of said annular form for suspending said torus winding therebetween with said primary conductor co-axially related to said annular form.

10. A current transformer for high frequency electrical energy comprising in combination a primary conductor and a secondary conductor, said primary conductor comprising a length of metal tubing having the ends thereof closed, said secondary conductor comprising a torus winding supported on an annular form, and a pair of insulating members each having a gradually increasing diameter, said members being secured adjacent opposite ends of said primary conductor at the smaller diameters thereof and engaging opposite sides of said annular form at the larger diameters thereof whereby said annular form is supported with respect to said primary conductor and co-axially related therewith.

ARTHUR M. TROGNER.